US008617627B2

(12) United States Patent
Steenhof et al.

(10) Patent No.: US 8,617,627 B2
(45) Date of Patent: Dec. 31, 2013

(54) FORM-RETAINING PAD FOR PREPARING A BEVERAGE SUITABLE FOR CONSUMPTION (75) Inventors: Vincent Jan Steenhof, 's-Hertogenbosch (NL); Bernardus Henricus Kok, Laag Soeren (NL); Joseph Theodoor Knitel, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 13/436,339

(22) Filed: Mar. 30, 2012

(65) Prior Publication Data

US 2012/0258205 A1  Oct. 11, 2012

Related U.S. Application Data (63) Continuation of application No. 10/481,073, filed as application No. PCT/NL03/00598 on Aug. 25, 2003, now Pat. No. 8,147,886.

(30) Foreign Application Priority Data

Aug. 23, 2002 (NL) ...................................... 1021325

(51) Int. Cl.
 *A23F 5/00* (2006.01)
(52) U.S. Cl.
 USPC ................... 426/78; 426/77; 426/79; 426/82; 426/112
(58) Field of Classification Search
 USPC .................... 426/77, 78, 79, 82, 112
 See application file for complete search history.

(56) References Cited

U.S. PATENT DOCUMENTS

| 2,967,776 | A | | 1/1961 | Utley |
| 3,083,101 | A | * | 3/1963 | Noury ............................. 99/295 |
| 3,433,464 | A | | 3/1969 | Swafford et al. |
| 3,450,024 | A | | 6/1969 | Martin |
| 3,803,101 | A | | 4/1974 | Noury |

(Continued)

FOREIGN PATENT DOCUMENTS

| DE | 40 37 366 A1 | 5/1992 |
| DE | 42 13 895 A1 | 11/1992 |

(Continued)

OTHER PUBLICATIONS

International Search Report for International Application No. PCT/NL03/00598, completed Oct. 29, 2003, 7 pages.

(Continued)

*Primary Examiner* — Anthony Weier
(74) *Attorney, Agent, or Firm* — Foley & Lardner LLP (57) ABSTRACT

A form-retaining pad for preparing a beverage suitable for consumption includes a first covering and a form-providing stiffening body, and a substance which is soluble in a liquid. The covering includes a top sheet and a bottom sheet that are manufactured from a material non-transmissive to the soluble substance, but transmissive to the substance dissolved in a liquid. The form-providing stiffening body is between the top sheet and the bottom sheet. The stiffening body has a compartmenting wall configuration having a grid structure which is transmissive to liquid from the top side to the bottom side. At least a part of the soluble substance is accommodated in the grid structure, and each compartment is surrounded by the wall configuration, the top sheet and the bottom sheet. At least the bottom side of the stiffening body includes a bulging part extending away from the top sheet.

55 Claims, 9 Drawing Sheets

(56) References Cited

U.S. PATENT DOCUMENTS

| | | |
|---|---|---|
| 4,446,158 A | 5/1984 | English et al. |
| 4,694,740 A | 9/1987 | Daloz |
| 4,801,464 A | 1/1989 | Hubbard, Jr. |
| 4,996,066 A | 2/1991 | Love et al. |
| 5,043,172 A | 8/1991 | Loizzi |
| 5,082,676 A | 1/1992 | Love et al. |
| 5,249,509 A | 10/1993 | English |
| 5,265,519 A | 11/1993 | Schiettecatte et al. |
| 5,472,719 A | 12/1995 | Favre |
| 5,477,775 A | 12/1995 | Delhom et al. |
| 5,518,743 A | 5/1996 | Pergola et al. |
| 5,638,740 A | 6/1997 | Cai |
| 5,895,672 A | 4/1999 | Cooper |
| 5,913,962 A | 6/1999 | Gasser et al. |
| 6,004,593 A | 12/1999 | Soughan |
| 6,009,792 A | 1/2000 | Kraan |
| 6,499,689 B1 | 12/2002 | Miyazaki |
| 6,769,352 B2 | 8/2004 | De Bruin et al. |
| 6,777,007 B2 | 8/2004 | Cai |
| 6,784,850 B2 | 8/2004 | Morooka et al. |
| 6,840,158 B2 | 1/2005 | Cai |
| 8,147,886 B2 * | 4/2012 | Steenhof et al. ................ 426/77 |
| 2001/0053399 A1 | 12/2001 | Herod |
| 2009/0022855 A1 | 1/2009 | Steenhof et al. |
| 2012/0258205 A1 | 10/2012 | Steenhof et al. |

FOREIGN PATENT DOCUMENTS

| | | |
|---|---|---|
| EP | 0 398 530 | 11/1990 |
| EP | 0 615 921 | 9/1994 |
| EP | 1 101 430 | 5/2001 |
| GB | 0 989 886 | 4/1965 |
| JP | 03-169311 | 7/1991 |
| JP | 06-046815 | 2/1994 |
| JP | 06-315437 | 11/1994 |
| WO | WO-89/12416 A2 | 12/1989 |
| WO | WO-00/51478 | 9/2000 |
| WO | WO-02/074143 A2 | 9/2002 |
| WO | WO-2004/056246 A1 | 7/2004 |
| WO | WO-2005/018394 A1 | 3/2005 |

OTHER PUBLICATIONS

International Search Report for International Application No. PCT/NL2006/000046, date of mailing Jul. 19, 2007, 3 pages.

International Search Report for International Application No. PCT/NL2006/000113, date of mailing May 31, 2006, 3 pages.

* cited by examiner

FORM-RETAINING PAD FOR PREPARING A BEVERAGE SUITABLE FOR CONSUMPTION

CROSS-REFERENCE TO RELATED PATENT APPLICATIONS

This application is a continuation of U.S. application Ser. No. 10/481,073, filed Aug. 25, 2003 now 8,147,886, which is a national stage application of International Application No. PCT/NL03/00598, filed Aug. 25, 2003, which claims the benefit of Netherlands Application No. 1021325, filed Aug. 23, 2002. All of these applications are incorporated by reference herein in their entireties.

BACKGROUND

The invention relates to a pad for preparing a beverage suitable for consumption, provided with at least one first covering, in which a substance, such as milk powder/creamer, sugar and similar additives, which is soluble in a liquid, such as water, is included, the covering being provided with a top sheet, manufactured from a material non-transmissive to the soluble substance, such as a layer of filter material, and with a bottom sheet, manufactured from a material non-transmissive to the soluble substance per se, but transmissive to the substance dissolved in a liquid, such as a layer of filter material.

Such a pad is known per se. The known pad is intended for use in a machine known per se, such as a coffee maker, for preparing the beverage suitable for consumption. Here, the pad is placed in a holder of the machine, after which hot water is supplied to the holder by means of the machine. Then, the hot water flows through a top filter sheet to an inner space of the covering in which the water-soluble substance is present. This substance dissolves in the water and then leaves the pad through a bottom filter sheet. The holder is provided with, for instance, at least one outlet opening through which the water with the substance dissolved therein can flow out of the holder.

A disadvantage of the known pad is that, in use, a considerable part of the water-soluble substance does not dissolve. The result is that, after preparation of the beverage suitable for consumption, a considerable part of the substance remains in the pad unused.

SUMMARY

It is an object of the invention to provide a form-retaining pad, allowing a larger part of the substance to dissolve when preparing an amount of beverage suitable for consumption than with the known pad, when the same amounts of beverage suitable for consumption are prepared with the known pad and the pad according to the invention.

For this purpose, in accordance with the invention, a form-retaining pad is provided for preparing a beverage suitable for consumption, provided with at least one first covering, in which, in a liquid, such as water, soluble substance, such as milk powder/creamer, sugar and similar additives, is included, the covering comprising a top sheet, manufactured from a material non-transmissive to the soluble substance, such as a layer of filter material, and a bottom sheet, manufactured from a material non-transmissive to the soluble substance, but transmissive to the substance dissolved in a liquid, such as a layer of filter material, the pad being further provided with a form-providing stiffening body, placed between the top sheet and the bottom sheet, the top sheet and the bottom sheet extending at least partly substantially parallel to each other and to a surface, the stiffening body having a top side adjacent to the top sheet and a bottom side adjacent to the bottom sheet, and, by provision of a compartmenting wall configuration therein, having a grid structure transmissive to liquid from the top side to the bottom side, in which structure at least a part of the soluble substance is accommodated and each compartment formed by the wall configuration is surrounded by that wall configuration, the top sheet and the bottom sheet. The measures according to the invention, that is, using a more or less block or disc-shaped stiffening body with good permeability, but also with a dividing and separating pattern for the soluble substance, are found to result in a larger part of that substance being dissolved when the liquid flows through than in the known pad. The possible cause of this is that the water flows through the pad with a better spread and/or that, as a result of the compartmenting wall configuration, the formation of relatively large lumps, that is, lumps larger than the passages in the grid structure transmissive to liquid, is prevented.

According to a further embodiment of the invention, a preference is expressed with regard to the important wall configuration that at least a part of the compartmenting wall configuration is formed by a grid which forms a plurality of compartments. In this manner, the stiffening body can be divided in a suitable manner into any desired transmissive grid with mutually separated compartments. In addition, it is also possible for at least a part of the compartmenting wall configuration to be formed by a spiral-shaped wall. In that case, it is possible to create a single long continuous compartment with a width suitable for the purpose. In fact, this involves a grid in which a plurality of neighboring compartments are interconnected and form the long continuous compartment, for instance by at least one opening in walls between these neighboring compartments. Of course, it is also possible to design a grid to be combined with an outer, inner or interposed spiral. Elongated compartments with a suitable width can also be realized by a configuration of parallel walls. Which specific wall configuration effects the most complete dissolution of the soluble substance in a specific case of application depends on the nature of the soluble substance(s), the supplied liquid and other factors, such as pressure and temperature.

Lumps often consist of a powder core, surrounded by a viscous mass which inhibits relatively fast dissolution of the powder core. In order to reduce the chance of such lumping together of the soluble substance, a relatively fine passage structure is preferred, that is, it can offer advantages according to a further embodiment of the invention, if each compartment formed by the wall configuration, measured perpendicular to a part of the wall configuration, has a width which is smaller than a third, preferably smaller than a quarter, more preferably smaller than a sixth, even more preferably smaller than an eighth of the hydraulic diameter, with hydraulic diameter being understood to mean the value obtained by four times dividing the surface by the perimeter of the stiffening body. In fact, this means that each particle of the soluble substance in the transmissive grid structure is located at a distance closer than the width referred to from a surface of the wall configuration. By keeping this distance relatively small, the diameter of a lump possibly starting to form will be relatively small, with the result that this lump will probably not be formed, or, due to its relatively small dimensions, and therefore small or no powder core, will dissolve quickly.

Preferably, neighboring compartments are separated by a single wall. In this manner, the inner space of the covering is optimally utilized to be filled with the substance. In other words, here, the wall configuration can take up a relatively small volume part of the inner part of the pad.

In particular, further, the top sheet is fixed to a top side of the stiffening body and the bottom sheet is fixed to a bottom side of the stiffening body. Here, the top sheet and the bottom sheet respectively can be fixed to the stiffening body near a longitudinal edge of the top sheet and the bottom sheet respectively. Further, in particular, the top sheet is fixed to a top side of the wall configuration and the bottom sheet is fixed to a bottom side of the wall configuration. Here, it is even possible for the top sheet and the bottom sheet to be connected to the edges of the compartments located near the openings so that the compartments are closed by the top sheet and bottom sheet. When the substance is powdery, this means that the substance cannot, for instance, move from one compartment to another compartment.

In particular, the pad is further provided with a second covering manufactured at least partly from a sheet-shaped filter material, in which the product to be extracted, such as ground coffee, is included, with the second covering extending above or under the first covering substantially parallel to the surface. When the substance consists of a milk powder/creamer and/or sugar and the product to be extracted of ground coffee, such a form-retaining pad is extremely suitable for preparing cappuccino. Here, in use, when, for instance, the second covering is located above the first covering, hot water is supplied under pressure to the top side of the second covering. In the second covering, this hot water forms a coffee extract which then flows to the first covering under the influence of the pressure, where the substance will dissolve in the coffee extract. The coffee extract with the substance dissolved therein then leaves the form-retaining pad through the bottom sheet of the first covering. The beverage obtained in this manner (coffee with dissolved substance) is now ready for consumption. However, the beverage can also be supplied to the apparatus described in European patent application 0 878 158 and by means of which air is whipped into the beverage to obtain a small-bubbled foam layer on the beverage. The beverage obtained in this manner is a cappuccino which is ready for consumption. Also, the beverage can be supplied to other known apparatuses to undergo further processing. For preparing the beverage, the form-retaining pad can be included in a holder known per se, which holder is provided with at least one outlet opening. In particular, this at least one outlet opening can form the spout opening described in European patent application 0 878 158 for obtaining a jet of the beverage which spouts into a buffer reservoir for obtaining a beverage with a small-bubbled foam layer.

In particular, the second embodiment is provided with a second covering provided with a top sheet manufactured at least partly from sheet-shaped filter material and a bottom sheet from sheet-shaped filter material, the top sheet and the bottom sheet being interconnected and preferably being interconnected at their longitudinal edges and more preferably being directly interconnected, with the interconnected parts forming a circular joint.

A further preferred embodiment of the invention can be obtained by providing the bottom side of the stiffening body with a bulging part, which is formed by increasing the height of a central part of the compartmenting wall configuration and has a surface extending parallel to aforesaid surface. If the central part is further arranged in a receded position relative to a bottom edge of a circumferential wall of the stiffening body such that the bottom side of the compartmenting wall configuration between the edge of the central surface and the bottom edge of the circumferential wall recedes relative to a line drawn between that edge of the central surface and that bottom edge of the circumferential wall and the bottom sheet extends over the central surface and from the edge thereof to the bottom edge of the circumferential wall, which preferably projects in an annular manner, and is fixed on or near this on the stiffening body, an annular channel is created between the wall configuration and the bottom sheet, which can promote the discharge of the liquid with the substance dissolved therein. Also in this embodiment, a further covering for including a substance to be extracted can be provided on the top sheet, with, if desired, the bottom side of that covering being formed by said top sheet.

Should it be desired to further refine the spread of the liquid over the stiffening body provided with the compartmenting wall configuration, then a separating body with a number of passages, more in particular a water distribution plate, such as a shower head plate, can be provided, while the separating body can form at least a part of the top sheet, or be additionally arranged on or under the top sheet.

Generally, the top sheet of the form-retaining pad will be formed by a layer of filter material, such as filter paper. However, it is also possible for the form-retaining pad to be designed with a top sheet consisting of a layer of material non-transmissive to liquid, which is provided in a withdrawable manner. In particular, this possibility can be used when a covering with a substance to be extracted, such as ground coffee, is placed on the form-retaining pad, with the filter layer of that covering then covering the then open top side of the form-retaining pad. When the stiffening body is suitably designed, it can be suitable for reuse in this design. This is because the open top side offers the possibility to sprinkle a soluble substance in the grid structure formed by the compartmenting wall configuration.

The invention also relates to an assembly of a form-retaining pad and an extraction pad manufactured at least partly from sheet-shaped filter material which is filled with a product to be extracted such as ground coffee. Here, a size of the extraction pad in a width direction of the extraction pad is preferably larger than a size of the form-retaining pad in a direction of the said surface of the form-retaining pad. Such an assembly can preferably be used for preparing coffee with hot milk, more in particular for preparing cappuccino. For this purpose, the product to be extracted is provided with ground coffee and the soluble substance is, for instance, provided with milk powder/creamer. Here, for instance, the form-retaining pad can be placed in a holder, with the extraction pad then being placed on top of the form-retaining pad. Then, for instance, hot water is supplied to the top side of the holder. This hot water is pressed through the extraction pad so that coffee extract is formed. Then, this coffee extract flows through the form-retaining pad so that the substance dissolves in the coffee extract. Because the substance is provided with milk powder/creamer, coffee extract with milk is formed in this manner. The beverage thus suitable for consumption can leave the holder via an outlet opening of the holder. It is again possible to supply the beverage obtained in this manner under pressure to the apparatus described in the abovementioned European patent application 0 878 158 for obtaining a beverage with a small-bubbled foam layer, in particular for obtaining cappuccino. Here as well, the outlet opening of the holder can be designed as the spout opening described in European patent application 0 878 158. The said assembly can also be offered to the consumer in one package.

The invention also relates to a method for preparing a beverage suitable for consumption using a form-retaining pad or an assembly, as discussed above, where an amount of a substance, such as milk powder/creamer, sugar and similar additives, which is soluble in a liquid, such as water, is accommodated in the form-retaining pad comprising a grid structure transmissive to liquid, formed by a compartmenting wall configuration, in a stiffening body covered in a closing manner by a top sheet and a bottom sheet, as well as an amount of substance to be extracted, such as ground coffee, accommodated in a covering, are placed in a holder, then a liquid, such as hot water is supplied, preferably under pressure, to the holder, in particular from a top side thereof, to the two substances, after which the beverage obtained in this manner is tapped via at least one outlet opening in a bottom side of the holder. Preferably, the covering is placed above the form-retaining pad, while it can be preferred that the beverage obtained can be discharged through a discharge opening designed as a spout opening such that a small-bubbled foam layer is obtained. Also, the covering can be placed under the form-retaining pad. As has already been discussed in the foregoing, such a method with a spout opening is particularly suitable for obtaining cappuccino. The form-retaining pad can be joined to form a whole with the covering or be used with a separate covering, while both the covering and the pad can be intended for single use, but the form-retaining pad with a design with a withdrawable top sheet can also be intended for repeated use.

It is noted that, although a pad with a stiffening body is known from EP-A-0 398 530, U.S. Pat. No. 4,446,158 and U.S. Pat. No. 5,082,676, this concerns a pad for including a product to be extracted, more in particular ground coffee. However, in such a pad, the problem of lumping does not occur. The known stiffening bodies referred to are thus provided with only a few stiffening ribs, which form rather large compartments and are substantially intended to give a pad which is freely suspended in a holder sufficient resistance to bending. As discussed above, the form-retaining pad according to the invention is inter alia intended to be placed in a holder in a supported manner, with the stiffening body preventing lumping, but also having an additional advantageous effect. The substance dissolved in the liquid leaves the pad, so that the pad would in effect be empty after dissolution and discharge of the soluble substance. However, in a position supported in a holder, the form-retaining pad, in its turn, needs to support a second covering placed above it containing a product to be extracted such as ground coffee. A pad which is drained during the preparation of the beverage could disturb the extraction process. However, the presence of the stiffening body in the thus form-retaining pad according to the invention ensures that this problem does not occur. This also applies when the form-retaining pad is borne by the holder while the second covering is located under the form-retaining pad in the holder and is also borne by the holder.

BRIEF DESCRIPTION OF THE DRAWINGS

FIG. 10b shows a top plan view of the extraction pad of the assembly according to FIG. 10a;

FIG. 20b shows a side view of the separating body according to FIG. 20a.

DETAILED DESCRIPTION OF EXEMPLARY EMBODIMENTS

Figures 1, 2, 4:
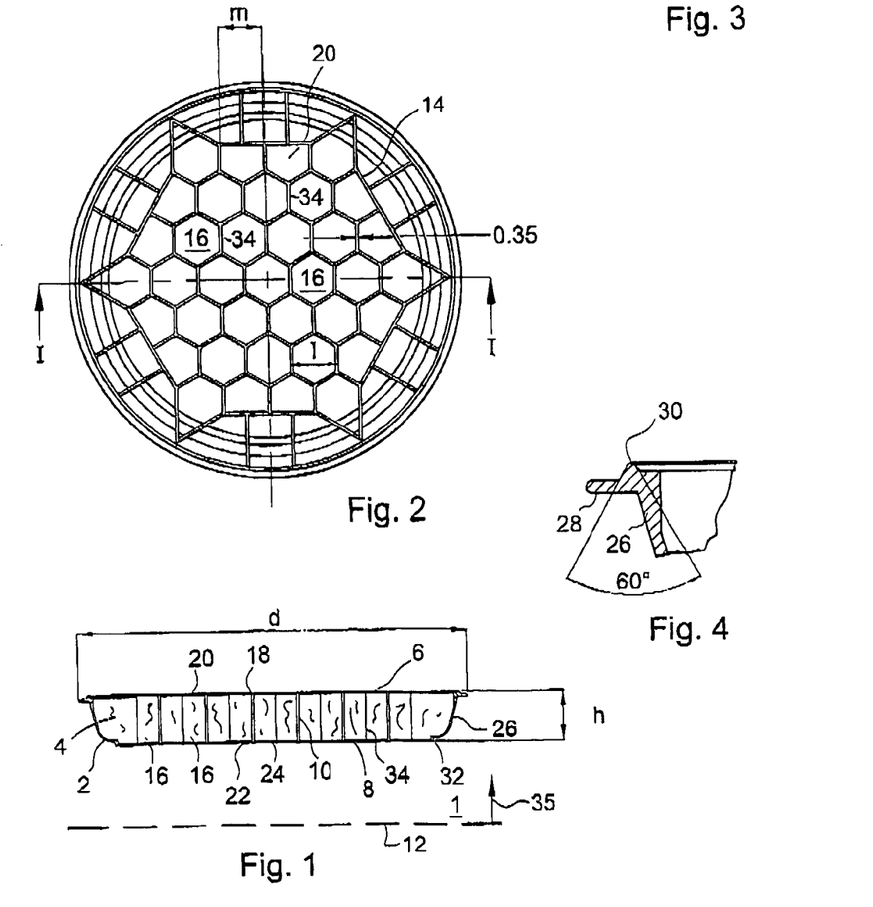
FIG. 1 shows a cross-section of a first embodiment of a form-retaining pad according to the invention.
FIG. 2 shows a top plan view of the stiffening body of the pad according to FIG. 1.
FIG. 4 shows a detail of the grid of the form-retaining pad according to FIG. 1.

In FIG. 1, reference numeral 1 designates a form-retaining pad for preparing a beverage suitable for consumption according to the invention. The form-retaining pad 1 is provided with at least one first covering 2 in which a water-soluble substance 4 is included. In this example, the water-soluble substance consists of milk powder/creamer. Other substances, such as powders for preparing drinking chocolate and other beverages suitable for consumption are also conceivable. Also, substances in other forms than powder form are possible such as concentrates and extracts.

The covering 2 comprises a top sheet 6 manufactured from sheet-shaped filter material and a bottom sheet 8 manufactured from sheet-shaped filter material. In this example, the top sheet 6 and the bottom sheet 8 are each manufactured from filter paper. However, other filter materials such as filter materials of a synthetic are also possible. The form-retaining pad is further provided with a stiffening body 10 which is included between the top sheet and bottom sheet. The top sheet and bottom sheet each extend at least partly substantially parallel to a surface 12.

The stiffening body 10 is provided with a compartmenting wall configuration extending parallel to the surface 12 and formed by a grid 14 (see FIG. 2 and FIG. 3), a plurality of compartments 16 being provided in the grid. Each compartment 16 is provided with an opening 20 in a top side 18 of the grid 14. Also, each compartment is provided with an opening 24 in a bottom side 22 of the grid. The top side of the stiffening body is adjacent to the top sheet 6 and the bottom side of the stiffening body is adjacent to the bottom sheet 8. More in particular, the top side 18 of the grid is adjacent to the top sheet 6 and the bottom side 22 of the grid 14 is adjacent to the bottom sheet 8. The compartmenting wall configuration thus comprises a grid structure which is transmissive to liquid from the top side to the bottom side.

Figure 3:
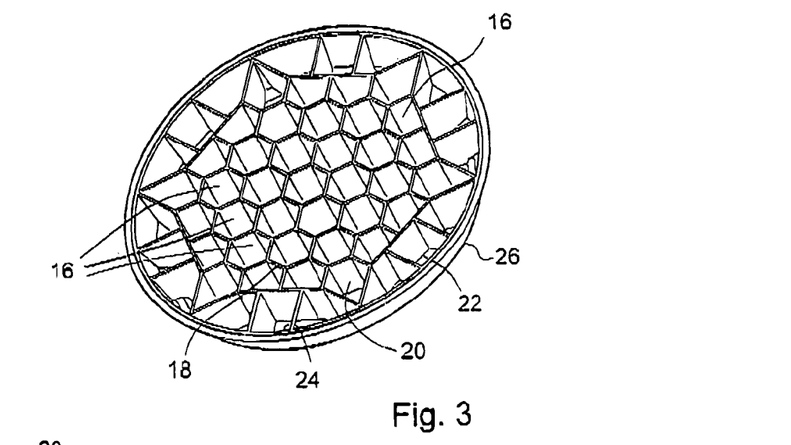
FIG. 3 shows, in perspective, the grid of the form-retaining pad according to FIG. 1.

In this example, the stiffening body is provided with an upstanding side wall 26 extending around a side of the grid. Further, the stiffening body is provided with a horizontal edge 28 extending around a side of the grid. The stiffening body is further provided on the top side with an upstanding edge 30 extending upwards which is in fact in line with the upstanding side wall 26. The top sheet is fixed to a top side of the stiffening body. In this example, the top sheet 6 is fixed, near its longitudinal edges, to the upstanding edge 30. The stiffening body is further provided, on its bottom side, with a circular edge 32 extending downwards. The bottom sheet is fixed to a bottom side of the stiffening body. In this example, the bottom sheet 8 is fixed to the edge 32 extending downwards. In this example, further, the top sheet is moreover fixed to a top side of the grid and the bottom sheet is moreover fixed to a bottom side of the grid. Furthermore, a number of the compartments have a honeycomb structure. Further, in this example, neighboring compartments are each separated from one another by single side walls 34. In this example, each of the compartments is filled with a water-soluble substance such as milk powder/creamer.

Furthermore, the pad 1 has a flat shape, with the pad having larger dimensions in the direction of the surface 12 than in a direction 35 perpendicular to the surface 12.

In this example, the grid/the compartmenting wall configuration is manufactured from a synthetic, such as plastic. However, the grid/the compartmenting wall configuration can also be manufactured from other materials such as metal, rubber, cardboard and/or a biodegradable material. In particular, the entire stiffening body is manufactured from a synthetic such as plastic, metal, rubber, cardboard and/or a biodegradable material. Further, in the example, the form-retaining pad has a disc-shaped (the shape of a round disc) design. The pad has, for instance, a diameter d of 40-80 mm, in particular a diameter of approximately 60 mm. The height of the pad is, for instance, 5-20 mm, in particular approximately 7 mm. A diameter 1 of the compartments forming a honeycomb structure is, for instance, 5-10 mm and preferably approximately 7 mm.

The form-retaining pad can be used in a manner known per se for preparing a beverage suitable for consumption. Thus, the pad can, for instance, be placed in the holder which is open on its top side and which is provided with at least one outlet opening in its bottom side. Such holders are known per se and are usually used in machines known per se for preparing a beverage suitable for consumption, such as espresso machines and other types of machines. By means of the machine, for instance, hot water can supplied under pressure to a top side of the holder. This hot water penetrates the form-retaining pad through the top sheet, with the substance dissolving in the water. The hot water with the substance dissolved therein can then leave the form-retaining pad via the bottom sheet and can then leave the holder via the at least one outlet opening. As a result of the compartments, here, a relatively large part of the substance will dissolve in the water. The beverage suitable for consumption which leaves the holder can then be collected in a container such as a cup. However, it is also possible for the beverage from the holder to be supplied to a spout opening for preparing a beverage suitable for consumption with a small-bubbled foam layer, such as for instance described in European patent application 0 878 158. Here, the outlet opening of the holder can, for instance, be designed as the spout opening.

Figure 5:
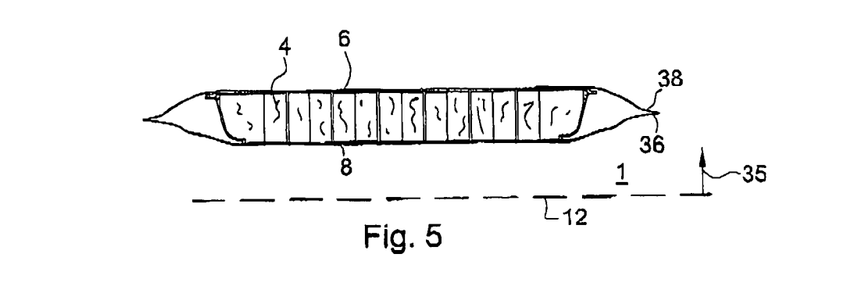
FIG. 5 shows a cross-section of a second embodiment of a form-retaining pad according to the invention.

In the example of FIG. 1, the top sheet 6 and the bottom sheet 8 are interconnected by interposition of the upstanding side wall 26. However, it is also possible for the top sheet 6 and the bottom sheet 8 to be directly interconnected. This is shown in FIG. 5. In FIG. 5, the bottom sheet 8 and the top sheet 6 are interconnected and, in this example, interconnected at longitudinal edges 36 of the top and bottom sheet and, in this example, moreover, directly connected to each other, the interconnected parts forming a circular joint 38. Here, the top sheet and/or the bottom sheet can also be connected to the top side 18 of the grid 14 and the bottom side 22 of the grid 14 respectively as discussed with reference to FIG. 1.

Figure 6:
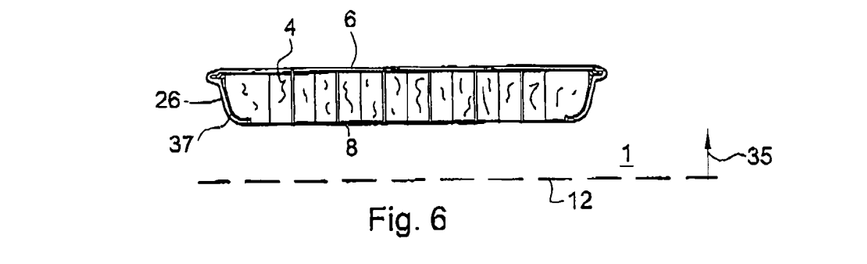
FIG. 6 shows a cross-section of a third embodiment of a form-retaining pad according to the invention.

FIG. 6 shows an alternative embodiment of the pad according to FIGS. 1-4. In FIGS. 1 and 6, a number of corresponding parts are designated by the same reference numerals. In the pad according to FIG. 6, the top sheet 6 and the bottom sheet 8 are connected to an outer side 37 of the upstanding wall. The top sheet 6 and the bottom sheet 8 respectively can optionally further be connected to a top side and a bottom side of the grid (optionally at a few points).

So, as discussed, the top sheet can be fixed to the stiffening body in various manners. For instance, it is possible for the top sheet to be connected (optionally only) to a top side of the grid. It is also possible for the top sheet to be connected (optionally only) to a top side of the upstanding side wall. In addition, it is possible for the top sheet to be connected (optionally only) to an outer side of the upstanding side wall. In particular, in the latter two options, the top sheet is also fixed to a top side of the grid. In the latter case, it is further possible for the top sheet to be fixed to only a few points of the top side of the grid. It is also possible for the top sheet and bottom sheet to be directly fixed to each other.

Also, as discussed, the bottom sheet can be fixed to the stiffening body in various manners. For instance, it is possible for the bottom sheet to be connected (optionally only) to a bottom side of the grid. It is also possible for the bottom sheet to be connected (optionally only) to a bottom side of the upstanding side wall. In addition, it is possible for the bottom sheet to be connected (optionally only) to an outer side of the upstanding side wall. In particular, in the latter two options, the bottom sheet is also fixed to a bottom side of the grid. In the latter case, it is further possible for the bottom sheet to be fixed to the bottom side of the grid to only a few points.

Figure 7:
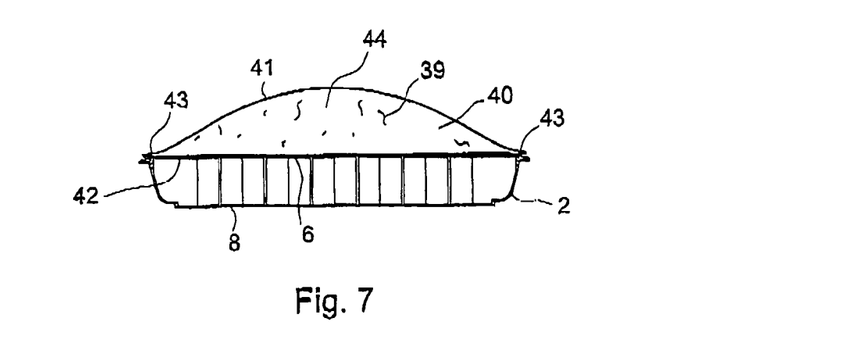
FIG. 7 shows a cross-section of a fourth embodiment of a form-retaining pad according to the invention.

In particular, the pad is further provided with a second covering 39 as shown in FIG. 7. In this example, the covering 39 is manufactured from sheet-shaped filter material. This sheet-shaped filter material can, for instance, be provided with filter paper. However, other sheet-shaped filter materials such as synthetic filter materials are also possible. In the second covering, a product to be extracted 40 such as coffee or tea is included. In this example, however, the product to be extracted is ground coffee 40. In this example, the second covering 39 is located above the first covering 2 and extends at least substantially parallel to the surface 12. In FIG. 7, the first covering 2 corresponds to the covering 2 discussed with reference to FIGS. 1-4. The second covering is provided with a top sheet 41 manufactured from sheet-shaped filter material and a bottom sheet 42 manufactured from sheet-shaped filter material. The top sheet 41 can, for instance, be manufactured from filter paper. This also applies to the bottom sheet 42. The top sheet 41 and the bottom sheet 42 are interconnected at their longitudinal edges, the interconnected parts forming a circular joint 43. The first and second covering are interconnected. In the pad according to FIG. 7, this has been realized because the bottom sheet 42 of the second covering 39 consists of the top sheet 6 of the first covering 2. It is also possible for the second covering 39 to be located under the first covering 2. In particular, the top sheet 41 of the second covering 39 then consists of the bottom sheet 8 of the first covering 2.

The form-retaining pad according to FIG. 7 can preferably be used for preparing coffee with milk. For this purpose, the form-retaining pad according to FIG. 7 is, for instance, placed in a holder known per se of, for instance, an espresso machine in the above-described manner. Then, hot water is supplied to a top side of the holder, preferably under pressure. In this manner, the water is supplied to both substances of the first and second covering. In this example, the hot water flows, at least partly, through the top sheet 41 to an inner space 44 of the second covering, where the coffee extract is formed. This coffee extract leaves the second covering 39 via the bottom sheet 42 and then enters the first covering 2 because the bottom sheet 42 also forms the top sheet of the first covering 2. In the first covering 2, the coffee extract flows through the compartments, where the substance will dissolve in the coffee extract and coffee with milk is formed. Then, this coffee with milk flows out of the pad 1 of FIG. 7 via the bottom sheet 8. Then, the coffee with milk can leave the holder via the at least one outlet opening of the holder. Thus, an amount of substance, such as milk powder/creamer, sugar and similar additives, soluble in a liquid, such as water, which is accommodated in the form-retaining pad comprising a grid structure transmissive to liquid, formed by a compartmenting wall configuration, in a stiffening body, covered in a closing manner by a top sheet and a bottom sheet, as well as a substance to be extracted, such as ground coffee, accommodated in a second covering, are placed in a holder, and then a liquid, such as hot water, is supplied to the holder to the two substances, in particular from a top side of the holder and preferably under pressure, after which the beverage obtained in this manner is tapped via at least one outlet opening in a bottom side of the holder. As discussed above, the beverage obtained in this manner can also be supplied to an apparatus for obtaining a beverage with a small-bubbled foam layer, as described in, for instance, European patent application 0 878 158. In this manner, cappuccino can be formed. Here, the outlet opening of the holder can be designed as the spout opening of the apparatus according to this European patent publication. When the second covering is placed below the first covering in the holder known per se and water is supplied to a top side of the holder, the water will first of all flow through the first covering, causing the substance in the first covering to dissolve, and the water will then flow through the extraction pad. In this case, the liquid is first supplied to the soluble substance and then to the substance to be extracted.

Figure 8:
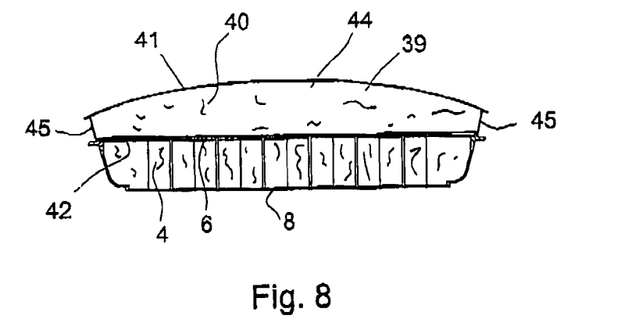
FIG. 8 shows a cross-section of a fifth embodiment of a form-retaining pad according to the invention.

FIG. 8 shows an alternative embodiment of the form-retaining pad of FIG. 7 filled with a product to be extracted 40. The pad of FIG. 8 is also provided with a second covering 39. The stiffening body is further provided with an annular upstanding edge 45. To a top side of the upstanding edge 45, the top sheet 41 of the second covering 39 is fixed. Here, the bottom sheet 42 of the second covering also consists of the top sheet 6 of the first covering 2.

Figure 9:
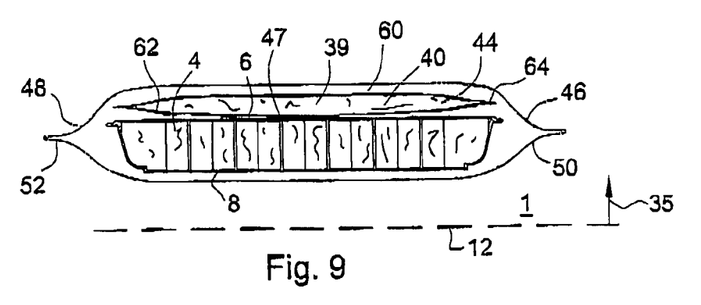
FIG. 9 shows a cross-section of a sixth embodiment of a form-retaining pad according to the invention.

FIG. 9 shows a second alternative embodiment for the form-retaining pad of FIG. 7. In FIG. 9 as well, the form-retaining pad is provided with a second covering 39 manufactured from sheet-shaped filter material such as filter paper, in which a product to be extracted such as ground coffee or tea 40 is included. In this example, the product to be extracted is ground coffee. Here as well, the second covering extends above the first covering at least substantially parallel to the surface 12. The first covering 2 corresponds to the covering as discussed with reference to FIGS. 1-3. However, the first covering 2 can also be designed as discussed with reference to FIGS. 5 and 6. The second covering 39 is again provided with a top sheet 60 manufactured from sheet-shaped filter material such as filter paper and a bottom sheet 62 manufactured from sheet-shaped filter material such as filter paper. In this example, however, the bottom sheet 62 consists of another sheet than the top sheet 6 of the first covering. The bottom sheet 62 and the top sheet 6 can be fixed to each other in a manner known per se, such as, for instance, by means of an adhesive connection 47. It is also possible for the combination of the first covering 2 and the second covering 39 to be included in a third covering 46. In this example, the third covering 46 is provided with a top sheet 48 manufactured from a sheet-shaped filter material such as filter paper and a bottom sheet 50 manufactured from sheet-shaped filter material such as filter paper. The bottom sheet 50 and the top sheet 48 are interconnected near their longitudinal edges. These longitudinal edges form a circular joint 52. In this example, the first covering 2 and the second covering 39 are kept together by the third covering 46 and the first covering 2 and the second covering 39 are not necessarily directly interconnected.

The form-retaining pad of FIG. 9 can likewise preferably be used, in each of its variants, for preparing coffee with milk and in particular for preparing cappuccino as discussed with reference to FIG. 7.

Figure 10A:
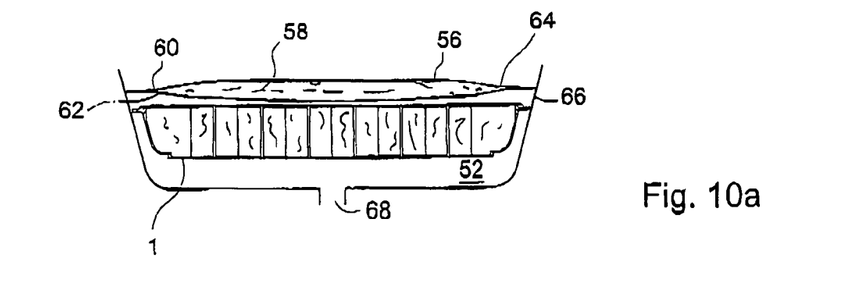
FIG. 10a shows a cross-section of a possible embodiment of an assembly included in a holder according to the invention, which assembly comprises a form-retaining pad according to the invention and an extraction pad.
Figure 10B:
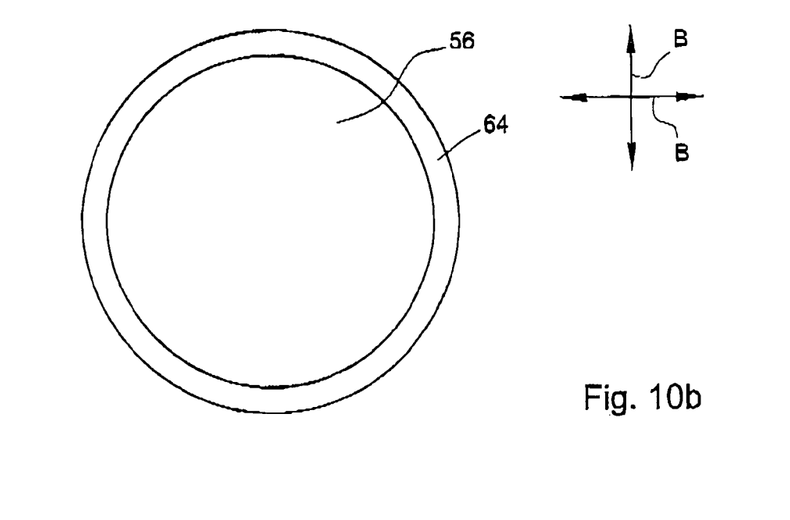

FIG. 10a shows an assembly according to the invention. The assembly 54 is provided with a form-retaining pad 1 of a type as discussed with reference to FIGS. 1-4 or, for instance, FIG. 5 or FIG. 6. The assembly is further provided with an extraction pad 56 known per se filled with a product to be extracted, such as for instance ground coffee. The extraction pad known per se is manufactured from sheet-shaped filter material such as filter paper and is, in this example, filled with ground coffee 58. A size of the extraction pad in a width direction B (see FIG. 10b) of the extraction pad is at least as large as and, in this example, corresponds to the size of the form-retaining pad in the direction of the said surface 12. In this example, the form-retaining pad 1 and the extraction pad 56 each have a disc-shaped design, with the form-retaining pad and extraction pad having an at least virtually equal diameter. The extraction pad known per se 56 is again provided with a top sheet 60 manufactured from sheet-shaped filter material such as filter paper and a bottom sheet 62 manufactured from sheet-shaped filter material such as filter paper, the top sheet and the bottom sheet being interconnected near their longitudinal edges, the connected parts forming a joint 64.

Figure 11:
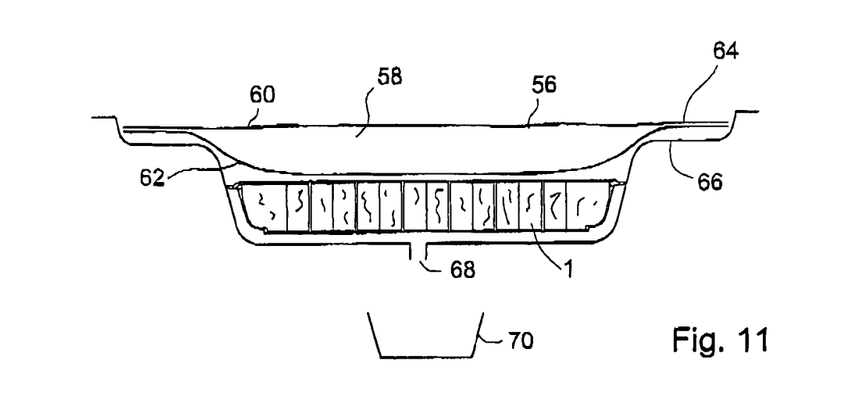
FIG. 11 shows a cross-section of a form-retaining pad and an extraction pad according to the invention included in a holder for preparing cappuccino.

Because the size of the extraction pad in the width direction B of the extraction pad is at least as large as and, in this example, corresponds to the size of the form-retaining pad in the direction of the surface 12, the form-retaining pad and the extraction pad can simply be included in a holder 66 provided with at least one outlet opening 68. The form-retaining pad 1 then rests on the bottom of the holder, while the extraction pad 56 is positioned on top of the form-retaining pad (see FIG. 10a). Then, hot water can be supplied to the top side of the holder for preparing the beverage suitable for consumption. In particular, the water is supplied under pressure. This pressure can assume the usual values for preparing espresso or coffee using the Senseo system. An additional advantage of the form-retaining pad in the examples is that the form of the form-retaining pad does not change or does not change substantially when the soluble substance dissolves and leaves the form-retaining pad. Therefore, the extraction process is not uncontrollably affected because a displacement and/or deformation of the extraction pad resulting from a deformation of the form-retaining pad does not occur or at least hardly occurs. This does not only apply when the extraction pad rests upon the form-retaining pad in the holder, but also when the form-retaining pad in the holder is supported by the holder while the extraction pad is located in the holder under the form-retaining pad. FIG. 11 also shows a holder known per se 66 in which the form-retaining pad 1 as well the extraction pad 56 of FIG. 10a are included. Because of the specific shape of the holder 66, in this example, the extraction pad 56 has a larger diameter than the form-retaining pad 1. This allows the extraction pad 56 to be positioned above (upstream of) the form-retaining pad. As said, hot water can be supplied (under pressure) to a top side of the holder 66, which hot water flows, at least partly, successively through the extraction pad 56 and the form-retaining pad 1, so that coffee extract and coffee extract with milk are formed successively. The coffee extract with milk leaves the holder 66 via the outlet opening 68 of the holder. In particular, the outlet opening 68 is designed as a spout opening known per se as described in European patent application 0 878 158. With this, a jet of coffee extract with milk is formed which spouts into a buffer reservoir 70 for obtaining a coffee extract with milk with a small-bubbled foam layer. In particular, in this example, cappuccino is formed in this manner. Instead of the assembly according to FIG. 10a, the form-retaining pad according to FIG. 7, 8 or 9 can also be used to fill the holder 66. Such variants are each considered to be within the scope of the invention.

Figure 12:
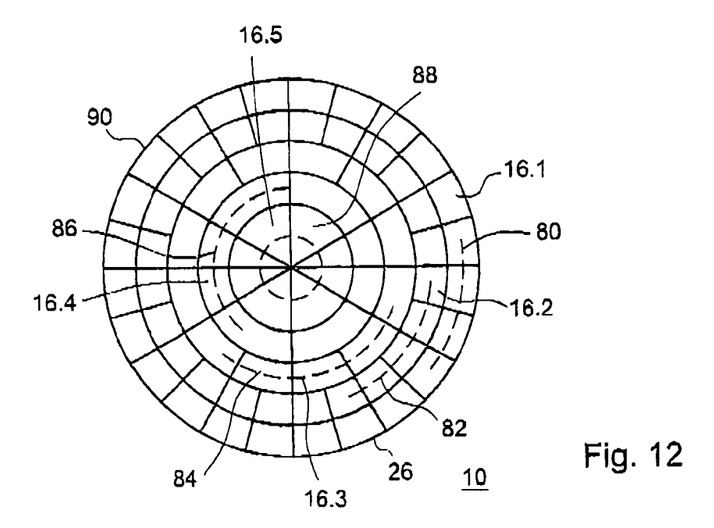
FIG. 12 shows a top plan view of a first alternative stiffening body of the form-retaining pads according to FIGS. 1-9.
Figure 13:
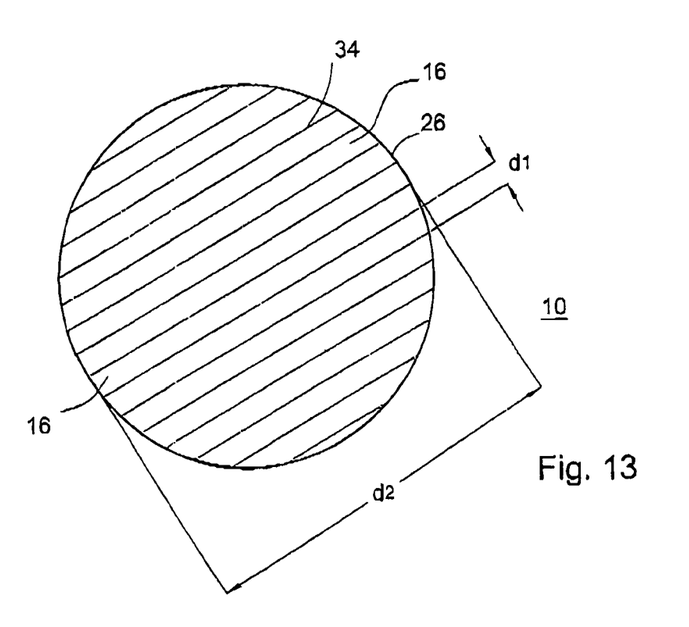
FIG. 13 shows a top plan view of a second alternative stiffening body of the form-retaining pads according to FIGS. 1-9.
Figure 14A:
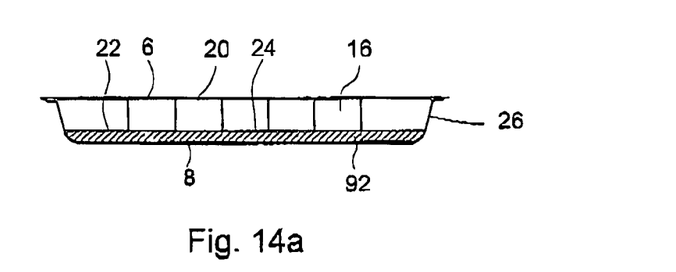
FIGS. 14a, 14b, 14c show a cross-section of a ninth, tenth and eleventh embodiment of a form-retaining pad according to the invention respectively.
Figure 14B:
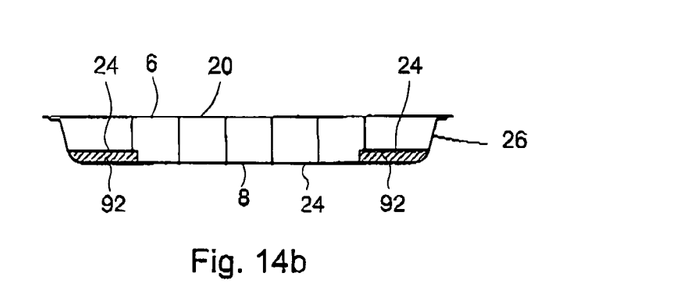
Figure 14C:
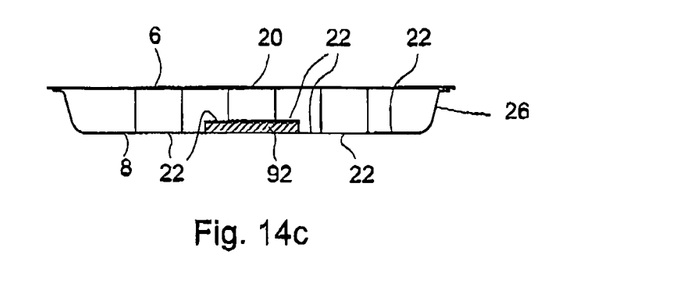

FIG. 12 shows a stiffening body 10 which can replace the stiffening body 10 of the pads according to FIGS. 1-9 to obtain alternative form-retaining pads according to the invention. The stiffening body is provided with compartments 16.1 located on an outer ring 80, compartments 16.2 located on a ring 82 within the outer ring, compartments 16.3 located on a ring 84 within the ring 82, compartments 16.4 located on a ring 86 within the ring 84 and compartments 16.5 located on a ring 88 within the ring 86. The compartments 16.1 and 16.2 are smaller than the compartments 16.3. Also the compartments 16.3 are smaller than the compartments 16.4. So, the stiffening body comprises a plurality of relatively small compartments (16.1 & 16.2 and 16.3 respectively) which are located at a relatively short distance from a circular edge 90 of the stiffening body and the stiffening body comprises a plurality of relatively large compartments (16.4 and 16.5 respectively) which are located at a relatively long distance from the circular edge. It has been found that, for instance, in use according to FIGS. 10 and 11, a relatively large part of the substance dissolves. In particular, the substance present in the compartments located at a relatively short distance from the circular edge also dissolves well. It has been found that a water flow through these compartments is sometimes hindered because, in use, the form-retaining pad lies on the bottom of the holder 66 at the location of these compartments. The surface of the compartments 16.1 is, for instance, 25-55 mm$^2$ and preferably 40 mm$^2$. The compartments 16.2, 16.3 and 16.4 are 35-66 mm$^2$ and preferably 50 mm$^2$, 45-75 mm$^2$ and preferably 60 mm$^2$, and 55-85 mm$^2$ and preferably 70 mm$^2$ respectively. FIG. 13 shows that the grid can also comprise compartments 16 which have an elongated design and are directed at least virtually parallel to each other. Here, for instance, it applies that d2>>d1. FIGS. 14a-14c show examples in which the bottom sheet 8 does not abut the grid everywhere. In those places where the bottom sheet 8 does not abut the grid, receiving spaces 92 are shown which can each, at least partly, be filled with the substance 4.

Figure 15:
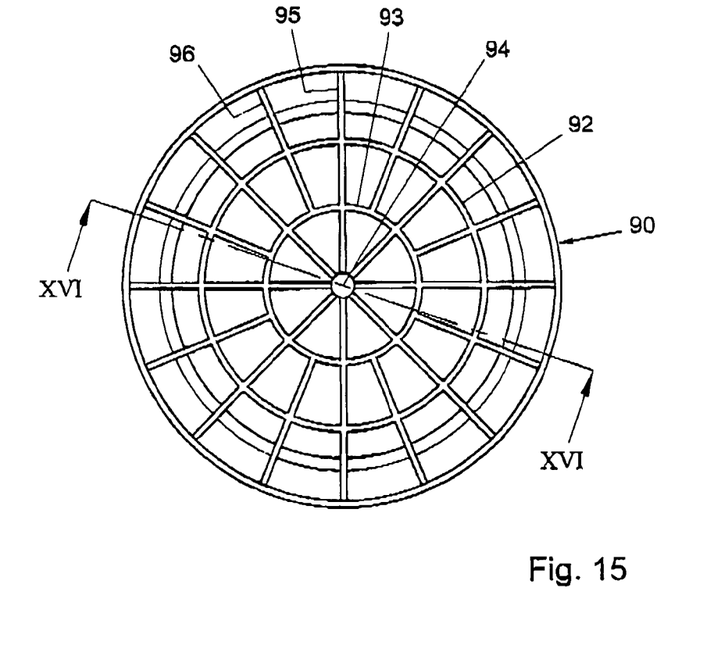
FIG. 15 shows a top plan view of a stiffening body of a twelfth embodiment of a form-retaining pad according to the invention.
Figure 16:
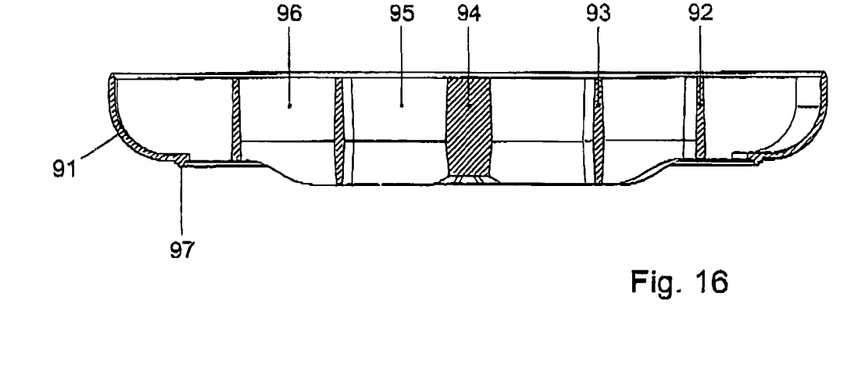
FIG. 16 shows cross-section along the line XVI-XVI in FIG. 15.

The stiffening body 90 shown in top plan view in FIG. 15 is provided with an annular circumferential wall 91, with two further annular walls 92 and 93 concentrically extending within the circumferential wall 91. From a central pen 94, eight walls 95 extend in a radially rotation-symmetrically distributed manner to the circumferential wall 91. In the middle between each two walls 95, a radially extending wall 96 is provided between the annular wall 93 and the circumferential wall 91. As shown in FIG. 16, the circumferential wall has a curved cross-section, so the circumferential wall 91 has an open dish shape with an open bottom, with a circular edge 97 extending downwards having formed near the circumference of the open bottom. Further, it is visible from FIG. 16 that the annular wall 93 has a greater height than the annular wall 92, with the annular wall 93 projecting through the said open bottom. The walls 95 and 96 follow the profile thus formed by the annular walls, the difference in height between the annular walls 95 and 96 being compensated on the bottom side by a smooth transition in the shape of an extended S. Thus, the stiffening body 90 is provided with bulging central part in relation to the circumferential wall 91. Further, the central pen 94 is has a somewhat shorter design than the annular wall 93, so the compartments adjacent to the central pen 94 are interconnected.

Figure 17:
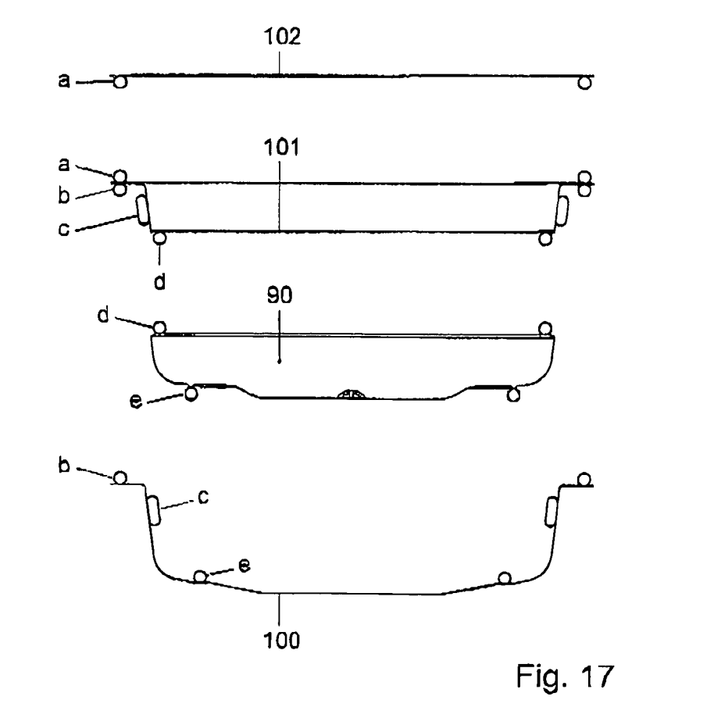
FIG. 17 shows the parts, including a stiffening body according to FIGS. 15 and 16, for forming an assembled pad.
Figure 18:
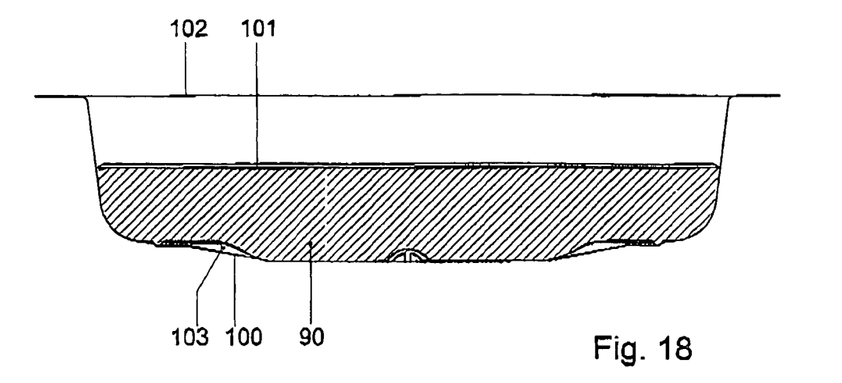
FIG. 18 shows the pad consisting of the parts shown in FIG. 17 in assembled form.

FIG. 17 diagrammatically shows the stiffening body 90 shown in FIGS. 15 and 16 together with a bottom sheet 100, a top sheet 101 and a covering sheet 102 for forming an assembled form-retaining pad, as shown in FIG. 18. To clarify the manner in which the assembled pad is obtained from the parts shown in FIG. 17, in FIG. 17, the corresponding sealing places on the different parts are designated by corresponding letters a-a, b-b, c-c, d-d, e-e.

As appears from FIG. 18, the central bulging part of the stiffening body 90 and the bottom sheet 100 stretched tightly over this and fixed to the circumferential wall 91 at e form a circular annular channel 103, via which channel the compartments adjacent to the walls 96 are interconnected. This, as well as the interconnection of the compartments adjacent to the central pen 94, can promote the complete dissolution and discharge of the soluble substance from the stiffening body 90.

In particular, in each of the embodiments discussed above, a smallest dimension of a compartment is smaller than a third, preferably smaller than a quarter, more preferably smaller than a sixth and even more preferably smaller than a seventh of a smallest diameter of the pad. Also, in each of the embodiments discussed above, a smallest dimension of a compartment is smaller than twice the thickness of the pad. Also, in each of the embodiments discussed above, the compartments with the said dimensions extend over at least virtually the whole pad. Preferably, the number of compartments per m$^2$ is 3,000-100,000, more preferably 10,000-30,000 per m$^2$ and even more preferably 16,000-20,000 per m$^2$. The sheet-shaped filter material can also consists of a plate of, for instance, metal or plastic in which small openings are provided. The sheet-shaped material can also consist of a reticular material provided with woven threads between which openings are formed. In addition, the pad can be designed such that it can be opened. This can be done by, for instance, providing the top sheet in a removable manner. The pad can then be opened after use and be filled again with the water-soluble substance. The form-retaining pad can also be used in apparatuses in which the water is not supplied to the form-retaining pad under pressure (pouring water).

Besides a round shape, the pad can also have other shapes such as a rectangular, square or oval shape. In this application, a stiffening body is involved. This is understood to mean that the body is so rigid that the body will hardly, if at all, deform in use.

In each of the embodiments described above, the walls 34 can also enclose angles other than ninety degrees with the surface 12. Also, the normal of each of the walls 14 can vary in vertical direction.

Figure 19A:
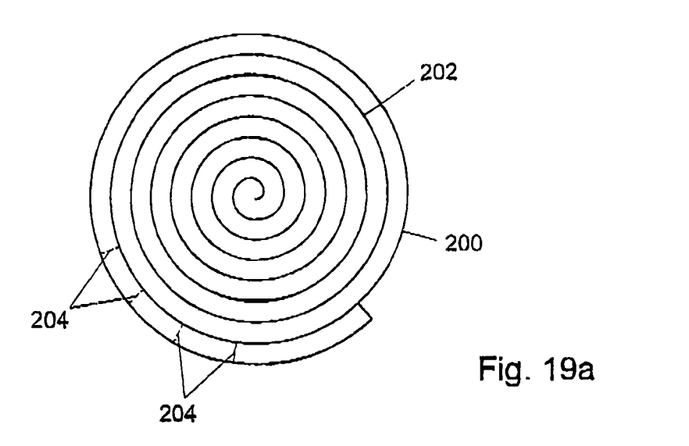
FIG. 19a shows a top plan view of a second alternative stiffening body of the form-retaining pad according to FIGS. 1-9.
Figure 19B:
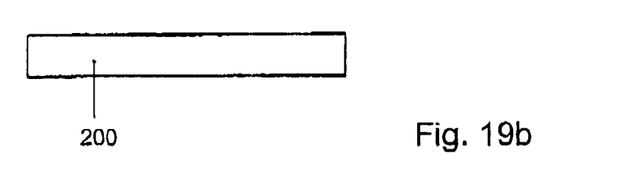
FIG. 19b shows a side view of the stiffening body according to FIG. 19b.

According to a special embodiment, a compartment is provided with more than one opening in its top side and/or bottom side. It is also possible for neighboring compartments to be interconnected, for instance by at least one opening in at least one wall 34 between these neighboring compartments. In this manner, a spiral-shaped stiffening body can also be obtained as will be discussed hereafter with reference to FIGS. 19a and 19b. Thus, it is possible for at least a part of the compartmenting wall configuration to be formed by a spiral-shaped wall. An example of such a stiffening body 200 is shown in FIGS. 19a and 19b and can, for instance, be used in each of the form-retaining pads according to FIGS. 1-10. Additionally, near the spiral 202, a number of side walls 204 can optionally be provided, of which a number are shown in dotted lines in FIG. 19a. However, these side walls can also be omitted.

In this application, a coffee pad is also understood to mean a coffee cartridge known per se.

In particular, further, for instance, the holder 66 and the form-retaining pad 1 as shown in FIGS. 10a, 11 can be interconnected before the extraction pad 56 and/or the second covering 39 are placed in the holder. Preferably, the form-retaining pad and the holder have an integrated design. This means that the form-retaining pad is further provided with a holder with a receiving space for including an extraction pad filled with a substance to be extracted such as ground coffee or tea, with the first covering being located below the receiving space and being in fluid communication with the receiving space. The form-retaining pad and holder then form, for instance, a "disposable holder".

In each of the form-retaining pads discussed, for instance with reference to FIGS. 1-6, 10-16 and 19, the top sheet of the first covering can be manufactured from a sheet non-transmissive to liquid, which is provided in a removable manner. This can then be removed before water is supplied to the form-retaining pad, when this pad has, for instance, been placed in the holder 66.

Figure 20A:
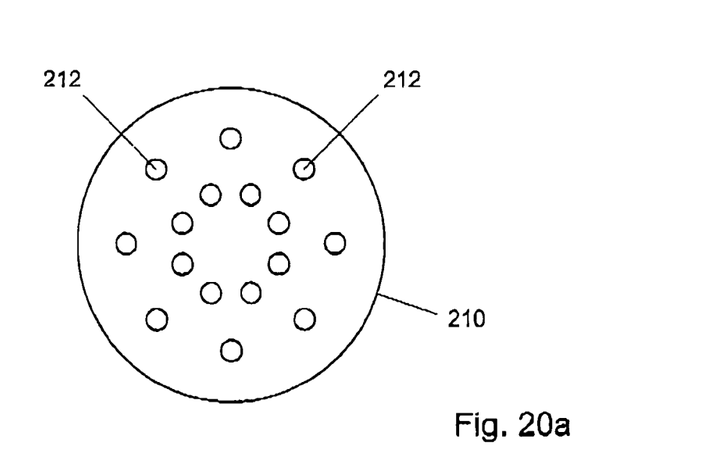
FIG. 20a shows a top plan view of a separating body which can be provided on a top side of a stiffening body.
Figure 20B:
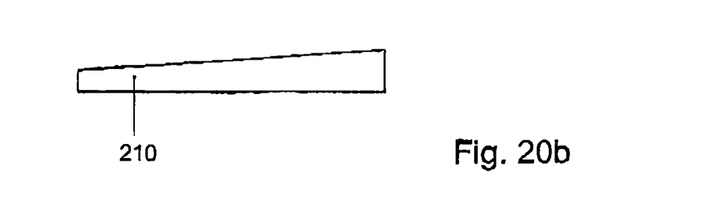

In particular, the tearable layer is removed before the form-retaining pad is placed in the holder and the second covering is placed on top of it or under it. The holder according to FIGS. 10a and 11 can, in use, also assume other positions when water is supplied to the holder under pressure; for instance, the holder 66 can also stand on its side or upside down. It is also conceivable that other types of holders are used in which the water is, for instance, supplied to a side or bottom side of the holder. Also, the form-retaining pad can further be characterized in that, on the stiffening body, a separating body with a number of passages, more in particular a water distribution plate, such as a shower head plate, has been provided. Such a separating body 210 is shown, for instance, in FIGS. 20a and 20b. The passages 212 can vary in number, position and (hydraulic) diameter. In particular, the separating body forms at least a part of the top sheet of the first covering. It is also possible for the separating body to be placed above the top sheet of the first covering 2. It is also possible for the separating body to be placed under the top sheet of the first covering 2. Here, the top sheet can be designed in a removable manner as discussed above and have a design non-transmissive to liquid. Also, the top sheet may be manufactured from a layer of filter material. The separating body may be manufactured from plastic or another material such as metal. Also, the top sheet may be partly (for instance an outer ring) formed from filter paper and partly (for instance an inner disc) from the separating body. It is also possible for the top sheet and the bottom sheet to form one and the same sheet of the first covering. Then, the notion of top sheet and the notion of bottom sheet are not limited to two different sheets which are interconnected. Other sheets or a single sheets can also form a (fictitious) top sheet and bottom sheet of the covering. So, the bottom sheet can also be a part of at least one sheet extending to the top side of the pad. The same applies, completely analogously, to the top sheet; optionally, this can also be partly formed from a sheet extending to the bottom side of the pad. All this also applies to the second covering.

In this example, the substance consists of milk powder/creamer. Other substances such as powder for drinking chocolate and powder for obtaining other flavors and variants are also conceivable. It is also conceivable that the substance has another form than the powder form. The substance may also be provided with a concentrate and/or an extract. Further, the stiffening body and the grid may be manufactured from other materials than synthetic, such as for instance cardboard, metal and/or combinations thereof. Further, the top sheet and the bottom sheet of the first covering may also form a concave or convex surface on their outer side. This concave or convex surface is, for instance, determined by a concave or convex form for the top side 18 and/or bottom side 22 of the grid. In this case, the top sheet 6 and the bottom sheet 8 are also directed substantially parallel to the surface 12. Also, the stiffening body can be provided with a number of grids stacked on top of each other, with, optionally, the compartments of one of the grids being provided such that they are receded in the direction of the surface in relation to the compartments of one of the other grids. Also, in each of the examples of FIGS. 7-11 and 18, it is possible for the first covering 2 and the second covering 39 to be mutually exchanged. Here, the stiffening body may also be designed according to the alternatives discussed above. The first covering 2 with the soluble substance will then be located above the second covering 39 with the product to be extracted. In the examples, the compartments 16, for the greater part, have a hexagonal design. Other n-gonal shapes (n≥3) are also possible, as well as round and oval shapes. The center-to-center distance m of neighboring compartments (see FIG. 2) can, for instance, be 6-10 mm and is preferably approximately 7 mm. The diameter of a wall 34 is, for instance, 0.2-0.5 mm and is preferably approximately 0.35 mm. When it is in powder form, the solubility of the soluble substance can be increased by agglomerating the powder. Such variants are also considered to be within the scope of the invention.

What is claimed is:

1. A form-retaining pad for preparing a beverage suitable for consumption, comprising:

a first covering, in which a substance which is soluble in a liquid is included, wherein the covering comprises a top sheet, manufactured from a material non-permeable to the soluble substance, and a bottom sheet, manufactured from a material non-permeable to the soluble substance, but permeable to the substance dissolved in a liquid;

a form-providing stiffening body placed between the top sheet and the bottom sheet, wherein the top sheet and the bottom sheet extend at least partly substantially parallel to each other, wherein the stiffening body has a top side adjacent to the top sheet, a bottom side adjacent to the bottom sheet, and a compartmenting wall configuration having a grid structure which is permeable to liquid from the top side to the bottom side, wherein at least a part of the soluble substance is accommodated in the grid structure, and each compartment formed by the wall configuration is surrounded by that wall configuration, the top sheet and the bottom sheet;

wherein at least the bottom side of the stiffening body includes a bulging part extending away from the top sheet.

2. The form-retaining pad of claim 1, wherein at least a part of the compartmenting wall configuration is formed by a grid which forms a plurality of compartments.

3. The form-retaining pad of claim 1, wherein at least a part of the compartmenting wall configuration is formed by a spiral-shaped wall.

4. The form-retaining pad of claim 1, wherein each compartment formed by the wall configuration, measured perpendicular to a part of the wall configuration, has a width which is smaller than a third of the hydraulic diameter, wherein hydraulic diameter is understood to mean the quotient of four times the passage surface divided by the passage perimeter.

5. The form-retaining pad of claim 1, wherein each compartment is bounded by a single wall.

6. The form-retaining pad of claim 1, wherein at least a number of the compartments have an n-gonal design, wherein n is a whole number greater than two.

7. The form-retaining pad of claim 5, wherein a number of the compartments form a honeycomb structure.

8. The form-retaining pad of claim 1, wherein at least a number of the compartments have a round or oval shape.

9. The form-retaining pad of claim 1, wherein the stiffening body is provided with an upstanding side wall extending around the wall configuration.

10. The form-retaining pad of claim 1, wherein the stiffening body is provided with a horizontal edge extending around the wall configuration.

11. The form-retaining pad of claim 1, wherein the top sheet is fixed to a top side of the stiffening body.

12. The form-retaining pad of claim 1, wherein the top sheet is fixed to a top side of the wall configuration.

13. The form-retaining pad of claim 9, wherein the top sheet is fixed to a top side of the upstanding side wall.

14. The form-retaining pad of claim 9, wherein the top sheet is fixed to an outer side of the upstanding side wall.

15. The form-retaining pad of claim 14, wherein the top sheet is also fixed to a top side of the wall configuration.

16. The form-retaining pad of claim 15, wherein the top sheet is fixed to a few points of the top side of the wall configuration.

17. The form-retaining pad of claim 1, wherein the bottom sheet is fixed to a bottom side of the stiffening body.

18. The form-retaining pad of claim 1, wherein the bottom sheet is fixed to a bottom side of the wall configuration.

19. The form-retaining pad of claim 9, wherein the bottom sheet is fixed to a bottom side of the upstanding side wall.

20. The form-retaining pad of claim 9, wherein the bottom sheet is fixed to an outer side of the upstanding side wall.

21. The form-retaining pad of claim 20, wherein the bottom sheet is also fixed to a bottom side of the wall configuration.

22. The form-retaining pad of claim 21, wherein the bottom sheet is fixed to a few points of the bottom side of the wall configuration.

23. The form-retaining pad of claim 1, wherein the bottom sheet and the top sheet are interconnected, wherein the interconnected parts form a joint.

24. The form-retaining pad of claim 1, wherein the pad has a flat shape, wherein the pad has larger dimensions in the direction of a surface at least substantially parallel to the top sheet and the bottom sheet than in a direction perpendicular to the surface.

25. The form-retaining pad of claim 1, wherein the stiffening body is manufactured from a synthetic.

26. The form-retaining pad of claim 1, wherein the form-retaining pad has a disc-shaped design.

27. The form-retaining pad of claim 1, wherein the top sheet and/or the bottom sheet of the first covering are/is manufactured from filter paper.

28. The form-retaining pad of claim 1, wherein the top sheet of the first covering is manufactured at least partly from a sheet non-permeable to liquid, which has been provided in a removable manner or is manufactured at least partly from a filter material which is permeable to a liquid including one of water and a coffee extract.

29. The form-retaining pad of claim 1, wherein the stiffening body comprises a plurality of relatively small compartments located at a relatively short distance from a circumferential edge of the stiffening body and that the stiffening body comprises a plurality of relatively large compartments located at a relatively long distance from the circumferential edge.

30. The form-retaining pad of claim 1, wherein the stiffening body comprises, at least also, a plurality of elongated compartments directed at least substantially parallel to each other.

31. The form-retaining pad of claim 1, wherein, between the wall configuration and the bottom sheet, the form-retaining pad is provided with at least one receiving space which is at least partly filled with the soluble substance.

32. The form-retaining pad of claim 1, wherein a top side of the stiffening body is formed as a convex or concave surface.

33. The form-retaining pad of claim 1, wherein a bottom side of the stiffening body is formed as a convex or concave surface.

34. The form-retaining pad of claim 1, wherein a smallest dimension of a compartment is smaller than a third of a smallest diameter of the pad.

35. The form-retaining pad of claim 1, wherein a smallest dimension of a compartment is smaller than twice the thickness of the pad.

36. The form-retaining pad of claim 34, wherein the compartments with the said dimensions extend over at least virtually the whole pad.

37. The form-retaining pad of claim 1, wherein the pad is provided with at least two stiffening bodies positioned above each other.

38. The form-retaining pad of claim 37, wherein the stiffening bodies are provided such that they are offset in relation to each other.

39. The form-retaining pad of claim 1, wherein the pad is further provided with a second covering manufactured at least partly from sheet-shaped filter material, in which a product to be extracted is accommodated, wherein the second covering extends above or under the first covering substantially parallel to a surface at least substantially parallel to the top sheet and bottom sheet.

40. The form-retaining pad of claim 39, wherein the second covering is provided with a top sheet manufactured from sheet-shaped filter material and a bottom sheet manufactured from sheet-shaped filter material, wherein the top sheet and the bottom sheet are interconnected, wherein the interconnected parts form a circular joint.

41. The form-retaining pad of claim 40, wherein the bottom sheet of the second covering is connected to the first covering.

42. The form-retaining pad of claim 40, wherein the bottom sheet of the second covering is formed by the top sheet of the first covering.

43. The form-retaining pad of claim 39, wherein the top sheet and/or bottom sheet of the second covering are/is manufactured from filter paper.

44. The form-retaining pad of claim 1, wherein the form-retaining pad is further provided with a holder with a receiving space for including an extraction pad filled with a substance to be extracted including one of ground coffee and tea, wherein the first covering is located below the receiving space and is in fluid communication with the receiving space.

45. The form-retaining pad of claim 1, wherein the bulging part is determined by an increase of the height of a part of the compartmenting wall configuration.

46. The form-retaining pad of claim 44, wherein the bulging part has a central surface extending parallel to a surface at least substantially parallel to the top sheet and the bottom sheet.

47. The form-retaining pad of claim 46, wherein the central surface forms a central part of the compartmenting wall configuration.

48. The form-retaining pad of claim 47, wherein the central part is arranged in such a receded manner in relation to a bottom edge of a circumferential wall of the stiffening body that the bottom side of the compartmenting wall configuration recedes between the edge of the central surface and the bottom edge of the circumferential wall in relation to a line drawn between that edge of the central surface and that bottom edge of the circumferential wall.

49. The form-retaining pad of claim 48, wherein the bottom sheet extends over the central surface and from the edge thereof to the bottom edge of the circumferential wall.

50. The form-retaining pad of claim 49, wherein the bottom sheet further extends from a fixation on the bottom edge of the circumferential wall along the circumferential wall to at least near an outer circumferential edge of the top sheet and is fixed thereon on or near a fixation of the top sheet on the stiffening body.

51. The form-retaining pad of claim 49, wherein the bottom sheet further extends from a fixation on the bottom edge of the circumferential wall along the circumferential wall and is connected to the top sheet to form a covering completely enclosing the stiffening body.

52. The form-retaining pad of claim 50, wherein the top sheet and/or the bottom sheet are further elongated and are/is connected there to a further sheet for forming an enclosed receiving space, in which the product to be extracted is accommodated.

53. A pad for preparing a beverage suitable for consumption comprising:
   a soluble substance;
   a first covering having a top sheet that is non-permeable to the soluble substance and a bottom sheet that is non-permeable to the soluble substance, but permeable to the soluble substance dissolved in a liquid; and
   a stiffening body disposed between the top sheet and the bottom sheet, wherein the stiffening body comprises a wall structure defining a plurality of compartments;
   wherein the soluble substance is provided within at least some of the plurality of compartments;
   wherein the stiffening body comprises a generally flat top surface and a contoured bottom surface such that the bottom comprises a bulge portion extending downward from a central portion of the stiffening body.

54. A pad for preparing a beverage suitable for consumption comprising:
   a soluble substance;
   a first covering having a top sheet that is non permeable to the soluble substance and a bottom sheet that is non permeable to the soluble substance, but permeable to the soluble substance dissolved in a liquid; and
   a stiffening body disposed between the top sheet and the bottom sheet, wherein the stiffening body comprises a wall structure defining a plurality of compartments;
   wherein the soluble substance is provided within at least some of the plurality of compartments;
   wherein the stiffening body comprises a center support and an outer circumferential wall, wherein at least two annular rings define compartments extending in a circumferential manner between the center support and the outer circumferential wall, and
   wherein a first plurality of radial divider walls extend from the outer circumferential wall to the central support and a second plurality of radial divider walls extend less than the entire distance from the outer circumferential wall and to the central support.

55. The pad of claim 54, wherein the second plurality of radial divider walls extend from the outer circumferential wall to one of the annular rings.

* * * * *